(12) United States Patent
Gier et al.

(10) Patent No.: US 8,003,723 B2
(45) Date of Patent: Aug. 23, 2011

(54) PYROLYSIS RESISTANT COATING FINISH

(75) Inventors: Andreas Gier, Saarbrücken (DE); Frank Jördens, Traunstein (DE); Axel Kalleder, Blieskastel (DE); Jürgen Salomon, Trostberg (DE); Gerhard Schmidmayer, Bad Endorf (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 350 days.

(21) Appl. No.: 12/086,378

(22) PCT Filed: Dec. 19, 2006

(86) PCT No.: PCT/EP2006/069941
§ 371 (c)(1),
(2), (4) Date: Jul. 8, 2008

(87) PCT Pub. No.: WO2007/082620
PCT Pub. Date: Jul. 26, 2007

(65) Prior Publication Data
US 2009/0099287 A1  Apr. 16, 2009

(30) Foreign Application Priority Data
Jan. 17, 2006  (DE) .......... 10 2006 002 264

(51) Int. Cl.
*C08L 83/00* (2006.01)
*C08K 3/00* (2006.01)
(52) U.S. Cl. .......... 524/261; 524/401; 524/588
(58) Field of Classification Search .......... 524/261, 524/401, 588
See application file for complete search history.

(56) References Cited

U.S. PATENT DOCUMENTS

| 4,828,623 | A | * | 5/1989 | Nitta et al. ........... 106/450 |
| 5,196,497 | A | * | 3/1993 | Weber et al. .......... 528/14 |
| 5,716,424 | A | | 2/1998 | Mennig et al. |
| 6,162,498 | A | | 12/2000 | Mennig et al. |
| 2007/0017402 | A1 | | 1/2007 | Jordens et al. |

FOREIGN PATENT DOCUMENTS

| DE | 44 19 706 | 12/1995 |
| DE | 100 59 487 | 6/2002 |
| DE | 201 21 109 | 4/2003 |
| EP | 0 640 670 | 3/1995 |
| EP | 1 215 252 | 6/2002 |
| WO | WO 95/13249 | 5/1995 |
| WO | WO 2005/068400 | 7/2005 |

OTHER PUBLICATIONS

International Search Report PCT/EP2006/069941.

* cited by examiner

*Primary Examiner* — Ling-Siu Choi
*Assistant Examiner* — Chun-Cheng Wang
(74) *Attorney, Agent, or Firm* — James E. Howard; Andre Pallapies

(57) ABSTRACT

A coating solution made from a mixture of at least one silane and at least one polysiloxane which can be hardened on a substrate by hydrolysis and condensation to give a coating on the substrate, wherein the at least one silane is of general formula $RxSi(OR')_{4-x}$ and the at least one polysiloxane is of general formula $[R_2SiO]_y$ or $R_3Si-(O-SiR_2)Y-O-SiR_3$, where R independently=alkyl, aryl, arylalkyl, alkylaryl or H, Rprime independently=H, methyl, ethyl, n- or i-propyl, n-, iso-, sec.- or tert.-butyl, x=0 or 1 (for the first silane), x=0, 1, 2, 3 or 4 (for each further silane) and y=a whole number of at least 2, wherein the coating solution includes at least one alkali or earth alkali oxide or hydroxide.

23 Claims, No Drawings

PYROLYSIS RESISTANT COATING FINISH

The invention relates to a coating system (a coating solution or a coating finish, all three terms will be used synonymously below) for protecting metal components from thermal and chemical attack. The present invention also relates to a method for producing said coating solution, a coating on a metal substrate, said coating being obtainable from the coating solution, and a cooking appliance component having said coating.

Pyrolytic cleaning of stoves and their accessories results in the metallic components of the oven and/or accessories being subjected to severe thermal (temperatures of up to 480 and even 500° C.) and chemical stress (food residues). Enamel coats cannot be used with the shock/impact stresses to be expected on the corresponding components, as the enamel tends to flake off. If one attempts to apply a glass coat wet-chemically by means of a coating finish produced by the sol-gel process, although the small layer thickness minimizes the tendency to flake off, the porosity of the hitherto known coats leads to diffusion of food constituents during pyrolysis, resulting in clearly visible staining of the coating.

The manufacturers of domestic appliances and in particular of domestic cooking ovens (stoves), specifically those with a "pyrolytic self-cleaning" feature, endeavor to use inexpensive types of high-grade steel for components in the oven field. The problem with using such steels is that they tarnish and/or severely corrode when subjected to thermal stress. In addition, the salts (particularly chlorides) contained in the food residues result in pitting corrosion of the steel at elevated temperatures.

This problem has been a constant preoccupation in the past, without any really satisfactory solutions emerging. Attempts have been made to solve the problem by using a high-grade steel surface with a transparent protective coat which prevents the high-grade steel surface from tarnishing when it is subject to thermal stress. On the other hand, it would also be conceivable to use decorative coatings for high-grade steel or lower-grade steels which protect the steel from corrosion even at high temperature load and provide it with a long-lasting decorative appearance.

Numerous coating systems/finishes with which steel surfaces can be decorated are specifically known from the prior art. They are as follows:

DE-A 43 38 360 teaches that vitreous coatings with functional particles can be manufactured using organically modified silanes by burning off the organic coating completely and in a defect-free manner. In this process, a compound obtainable by hydrolysis and condensation of at least one hydrolyzable silane $SiX_4$ (or an oligomer derived therefrom) and at least one organosilane with at least one hydrolyzable and if required a non-hydrolyzable residue (or an oligomer) derived therefrom is mixed with at least one functional element such as a temperature-resistant dye/pigment, metal/non-metal oxide, coloring metal ion, metal or metal-compound colloid and metal ions which react under reduction conditions to produce metal colloids. These coatings are described in DE-A 43 38 360 as several pm thick (up to 3.5 μm). However, practical reworking of the disclosed teaching shows that the coatings have a thickness of only approximately 1 μm. Therefore it is in practice not possible to incorporate pigments with a particle size of >1 μm in the starting sol for these layers. Moreover, although these coatings are defect-free after temperature aging, they are porous particularly in the temperature range from 200 to 300° C. because of the decomposition of organic residues. It is precisely in this temperature range that high-grade steels tarnish and would not be adequately protected because of the porosity of the coating. In addition, decomposition of the organic residues is not 100% successful with such coatings. This in turn means that during the entire period of use of such coatings it cannot be ensured that no harmful emissions occur (by emissions is meant in this case cracking products from the organic silanes from the starting sol).

DE-A 42 17 432 describes that it is possible to use sols based on organosilanes with the addition of nanoscale $SiO_2$ particles to produce coatings up to 10 μm thick. These sols are known for their good wetting and excellent adhesion and are characterized by good thermal stability. However, the coatings described are unsuitable for achieving the stated object for two reasons. First, according to the teaching of DE-A 42 17 432 they only allow glasses to be coated. Second, when re-working the instructions set forth in DE-A 42 17 432, the person skilled in the art will discover that only strongly acidic coating sols are accessible (even if DE-A 42 17 432 asserts likewise for basic sols), as may be easily deduced from the exemplary embodiments. However, such acidic coating sols are unsuitable for coating particularly non-high-grade steel, as corrosion of the steel surface would occur even during the coating process. Corresponding corrosion areas would be defects which would inevitable result in damage or destruction of the coating during use. In addition, it is known from unpublished studies of the applicant that such coatings are unsuitable for use in cooking appliances because of their insufficient stability and cleanability and also because of their tendency to stain (staining due to pyrolyzed food residues).

DE-As 197 14 949 and 100 59 487 describe the production of silicate-base sols and their application to metal surfaces. In addition to the organosilanes, the coating system has either (i) nanoscale $SiO_2$ particles or (ii) an alkali/alkaline-earth oxide/hydroxide or (iii) nanoscale $SiO_2$ particles and an alkali/alkaline-earth oxide/hydroxide. The coatings are described as having thicknesses of up to 10 μm, the critical coating thickness being unsatisfactorily low, however. According to the invention, critical coating thickness is taken to mean the coating thickness up to which, after drying and densification of the coating system applied to the substrate (e.g. glass, metal), no cracks and/or pores remain in the coating, i.e. up to which the pores sinter densely during densification so that the undesirable diffusion of food residues, particularly during pyrolysis, does not then occur.

In short, the shortcomings of the prior art in the specific field of application of cooking appliances (stoves) may be summarized as follows: all the known coating systems/finishes/solutions fail because they produce coatings which
- exhibit poor thermal stability and/or
- have an inadequate anti-corrosion effect when using non-high-grade steels and/or
- do not prevent or even themselves cause emissions (as defined above) when subjected to thermal stress and/or
- provide no or only inadequate anti-tarnish protection on high-grade steel.

Accordingly the inventors of the present application have set themselves the object of developing transparent or decorative coating materials which do not have, or at least only exhibit to an attenuated degree, the deficiencies of the coating systems/finishes known from the prior art. The objective was therefore to develop a coating solution or more specifically a coating system/finish which (i) because of its protective effect can prevent tarnishing of the substrate (high-grade steel) under temperature load, i.e. provides a sufficiently permeation-proof (primarily $O_2$-impermeable) coating, (ii) has a decorative effect as a finished coating, i.e. visually conceals the temper color of less high-grade steels, (iii) can be applied to and densified on sometimes complexly shaped components in a sufficiently thick and in particular crack-free manner, (iv) exhibits very good chemical stability as a finished coating and (v) otherwise fulfills all the requirements from the cooking appliance field (these include e.g. sufficient mechanical stability in order to ensure problem-free operation, the coating system must also contain no physiologically dangerous heavy metals or their oxides and also produce no harmful emissions during operation at high temperatures). Expressed in simple terms, the inventors' object was to apply to thermally stressed metal and in particular (high-grade) steel substrates a coating which also ensures aesthetically pleasing surfaces on a permanent basis.

The inventors have achieved this object by providing a coating solution which is a sol composition. The coating solution is based on a mixture of at least one silane and at least one polysiloxane which can be cured by hydrolysis and condensation on a substrate to produce a coating on the substrate, the at least one silane having the general formula $R_xSi(OR')_{4-x}$ and the at least one polysiloxane having the general formula $[R_2SiO]_y$ or $R_3Si-(O-SiR_2)_y-O-SiR_3$, in which
- the residues R are independently alkyl, aryl, arylalkyl, alkylaryl or H;
- the residues R' are independently H, methyl, ethyl, n- or i-propyl, n-, iso-, sec- or tert-butyl;
- x=0 or 1 (for the first silane);
- x=0, 1, 2, 3 or 4 (for every other silane); and
- y= is an integer which is at least 2 and can be virtually infinitely large.

The coating solution is also characterized in that it additionally has at least one alkali or alkaline-earth oxide or hydroxide, but need not necessarily have nanoscale $SiO_2$ particles in order to actually achieve the object underlying the present invention. However, it is also in no way disadvantageous if the coating solution has such nanoscale $SiO_2$ particles.

Alkali oxides/hydroxides, in particular the alkali oxides (especially $K_2O$), are preferred as the alkali/alkaline-earth oxide/hydroxide. However, the alkali hydroxides, and in particular KOH and NaOH, are likewise preferred.

The inventive coating solution can additionally include at least one solvent (LM) whose boiling point is higher than that of ethanol (b.p. of ethanol 78.32° C.). Examples of such solvents are long-chain alcohols generally, such as 2-butanol. In principle all solvents that are compatible with the coating sol (coating finish) and which can be removed during the drying step following application of the coating finish at approximately 120° C. are suitable.

The at least one polysiloxane is also known as a silicatic diluent component or silicatic reactive diluent. Said silicatic reactive diluent contributes to significantly improved densification and increased hydrophobicity of the coating. It is therefore formed as a diffusion barrier which effectively prevents staining during pyrolysis mode.

The ratio of the silicatic components (silane and polysiloxane) to the alkali/alkaline-earth oxide/hydroxide, referred to the atomic ratio Si:alkali metal, is 20:1 to 5:1, in particular 15:1 to 10:1. Other specifications (see preferred embodiments below) of the ratio of the silicatic components to the alkali/alkaline-earth oxide/hydroxide likewise relate to the atomic ratio Si:alkali metal.

x is preferably defined as 1 for the first silane. According to another preferred embodiment, R' is either methyl or ethyl. According to another preferred embodiment, R' is methyl or ethyl and x=1. According to yet another preferred embodiment, R' is methyl (or ethyl), the alkali/alkaline-earth oxide/hydroxide is KOH and x=1.

Particularly preferred are coating solutions/systems/finishes to which the following conditions apply (the ratios in each case relate to the respective atomic weights):
(a) x=1, R═H, all R'=methyl, the alkali/alkaline-earth component is KOH and the ratio Si:K=15:1 to 10:1
(b) x=1, R=methyl, all R'=methyl, the alkali/alkaline-earth component is KOH and the ratio Si:K=15:1 to 10:1
(c) x=1, R=ethyl, all R'=methyl, the alkali/alkaline-earth component is KOH and the ratio Si: K=15:1 to 10:1
(d) x=1, R=methyl, all R'=ethyl, the alkali/alkaline-earth component is KOH and the ratio Si: K=15:1 to 10:1
(e) x=1, R═H, all R'=ethyl, the alkali/alkaline-earth component is KOH and the ratio Si:K=15:1 to 10:1
(f) x=1, R=ethyl, all R'=ethyl, the alkali/alkaline-earth component is KOH and the ratio Si:K=15:1 to 10:1
(h) x=0, all R'=ethyl, the alkali/alkaline-earth component is KOH and the ratio Si:K=15:1 to 10:1
(i) x=0, all R'=n-propyl, the alkali/alkaline-earth component is KOH and the ratio Si:K=15:1 to 10:1
(j) x=0, all R'=i-propyl, the alkali/alkaline-earth component is KOH and the ratio Si:K=15:1 to 10:1
(k) x=0, all R'=n-butyl, the alkali/alkaline-earth component is KOH and the ratio Si:K=15:1 to 10:1
(l) x=0, all R'=i-butyl, the alkali/alkaline-earth component is KOH and the ratio Si:K=15:1 to 10:1
(m) x=1, R═H, all R'=methyl, the alkali/alkaline-earth component is NaOH and the ratio Si:Na=15:1 to 10:1
(n) x=1, R=methyl, all R'=methyl, the alkali/alkaline-earth component is NaOH and the ratio Si:Na=15:1 to 10:1
(o) x=1, R=ethyl, all R'=methyl, the alkali/alkaline-earth component is NaOH and the ratio Si:Na=15:1 to 10:1
(p) x=1, R=methyl, all R'=ethyl, the alkali/alkaline-earth component is NaOH and the ratio Si:Na=15:1 to 10:1
(q) x=1, R═H, all R'=ethyl, the alkali/alkaline-earth component is NaOH and the ratio Si:Na=15:1 to 10:1
(r) x=1, R=ethyl, all R'=ethyl, the alkali/alkaline-earth component is NaOH and the ratio Si:Na=15:1 to 10:1
(s) x=0, all R'=methyl, the alkali/alkaline-earth component is NaOH and the ratio Si:Na=15:1 to 10:1
(t) x=0, all R'=ethyl, the alkali/alkaline-earth component is NaOH and the ratio Si:Na=15:1 to 10:1
(u) x=0, all R'=n-propyl, the alkali/alkaline-earth component is NaOH and the ratio Si:Na=15:1 to 10:1
(v) x=0, all R'=i-propyl, the alkali/alkaline-earth component is NaOH and the ratio Si:Na=15:1 to 10:1
(w) x=0, all R'=n-butyl, the alkali/alkaline-earth component is NaOH and the ratio Si:Na=15:1 to 10:1
(y) x=1, R═H, two R'=methyl, one R'=ethyl, the alkali/alkaline-earth component is NaOH and the ratio Si:Na=15:1 to 10:1
(z) x=1, R=methyl, two R'=methyl, one R'=ethyl, the alkali/alkaline-earth component is NaOH and the ratio Si:Na=15:1 to 10:1
(aa) x=1, R=ethyl, two R'=methyl, one R'=ethyl, the alkali/alkaline-earth component is NaOH and the ratio Si:Na=15:1 to 10:1
(bb) x=1, R=methyl, two R'=methyl, one R'=ethyl, the alkali/alkaline-earth component is NaOH and the ratio Si:Na=15:1 to 10:1
(cc) x=1, R═H, two R'=methyl, one R'=ethyl, the alkali/alkaline-earth component is NaOH and the ratio Si:Na=15:1 to 10:1
(dd) x=1, R=ethyl, two R'=methyl, one R'=ethyl, the alkali/alkaline-earth component is NaOH and the ratio Si:Na=15:1 to 10:1
(ee) x=0, two R'=methyl and ethyl, the alkali/alkaline-earth component is NaOH and the ratio Si:Na=15:1 to 10:1

(ff) x=0, three/one R'=methyl/ethyl, the alkali/alkaline-earth component is NaOH and the ratio Si:Na=15:1 to 10:1

(gg) x=0, three/one R'=ethyl/methyl, the alkali/alkaline-earth component is NaOH and the ratio Si:Na=15:1 to 10:1

(hh) x=0, two R'=methyl and i-propyl, the alkali/alkaline-earth component is NaOH and the ratio Si:Na=15:1 to 10:1

(ii) x=0, three/one R'=methyl/i-propyl, the alkali/alkaline-earth component is NaOH and the ratio Si:Na=15:1 to 10:1

(jj) x=0, three/one R'=i-propyl/methyl, the alkali/alkaline-earth component is NaOH and the ratio Si:Na=15:1 to 10:1

(kk) x=1, R=H, two R'=methyl, one R'=ethyl, the alkali/alkaline-earth component is KOH and the ratio Si:Na=15:1 to 10:1

(ll) x=1, R=methyl, two R'=methyl, one R'=ethyl, the alkali/alkaline-earth component is KOH and the ratio Si:K=15:1 to 10:1

(mm) x=1, R=ethyl, two R'=methyl, one R'=ethyl, the alkali/alkaline-earth component is KOH and the ratio Si:K=15:1 to 10:1

(nn) x=1, R=methyl, two R'=methyl, one R'=ethyl, the alkali/alkaline-earth component is KOH and the ratio Si:K=15:1 to 10:1

(pp) x=1, R=ethyl, two R'=methyl, one R'=ethyl, the alkali/alkaline-earth component is KOH and the ratio Si:K=15:1 to 10:1

(qq) x=0, R=H, two R'=methyl and ethyl, the alkali/alkaline-earth component is KOH and the ratio Si:K=15:1 to 10:1

(rr) x=0, three/one R'=methyl/ethyl, the alkali/alkaline-earth component is KOH and the ratio Si:K=15:1 to 10:1

(ss) x=0, three/one R'=ethyl/methyl, the alkali/alkaline-earth component is KOH and the ratio Si:K=15:1 to 10:1

(tt) x=0, two R'=methyl and i-propyl, the alkali/alkaline-earth component is KOH and the ratio Si:K=15:1 to 10:1

(uu) x=0, three/one R'=i-propyl/methyl, the alkali/alkaline-earth component is KOH and the ratio Si:K=15:1 to 10:1

(vv) x=0, one/three R'=i-propyl/methyl, the alkali/alkaline-earth component is KOH and the ratio Si:K=15:1 to 10:1

Most particularly preferred are coating solutions/systems/finishes to which the following conditions apply (the ratios refer to the atomic weights in each case):

(a) x=1, R=methyl, all R'=ethyl, the alkali/alkaline-earth component is KOH and the ratio Si:K=13:1 to 10:1, in particular 12:1 to 11:1

(b) x=1, R=ethyl, all R'=methyl, the alkali/alkaline-earth component is KOH and the ratio Si:K=13:1 to 10:1, in particular 12:1 to 11:1

(c) x=1, R=methyl, all R'=ethyl, the alkali/alkaline-earth component is NaOH and the ratio Si:Na=13:1 to 10:1, in particular 12:1 to 11:1

(d) x=1, R=ethyl, all R'=ethyl, the alkali/alkaline-earth component is NaOH and the ratio Si:Na=13:1 to 10:1, in particular 12:1 to 11:1

During condensation of the at least one silane in the abovementioned mixture from the at least one silane, the alkali/alkaline-earth oxide/hydroxide and the at least one polysiloxane (condensation is effected by increasing the temperature) after its application to the substrate, alcohols or water are formed which are mostly removed again in the course of drying or densification of the coating solution and its conversion into the finished coating.

After its application to the substrate, its drying (normally approximately 10 min. at approximately 120° C.), densification (normally approximately 15 min. at approximately 500° C.) and its firing-on as a coating on the substrate, the coating solution according to the invention is not only temperature-resistant up to 500° C. (in multiple repeat testing it was even found that the material is stable even at 600° C. loading), but also unsusceptible to staining by burnt-on food, as well as scratch- and impact-resistant. In addition, it is also inexpensive to apply.

A major advantage of the coating solution of the present invention is that, after its application, drying and densification and well as its firing-on and conversion into a coating, it releases no cracking products (harmful emissions) nor is it destroyed even at operating temperatures of up to 450 or 500° C.

Another major advantage of the coating solution according to the invention is that it dispenses with nanoscale $SiO_2$ particles whose role is not only assumed by the use of a polysiloxane, but surprisingly even bettered, which is reflected in an increased solids content in the coating and therefore a higher critical coating thickness. On the other hand, however, the use of the polysiloxane brings about a significant reduction in the surface energy of the coating even at high temperatures as well as improved hydrophobicity of the coating or rather of its surface even at elevated temperatures, which is likewise advantageous for using the coating on (high-grade) steel parts of domestic appliances. Another advantage associated with using the polysiloxane instead of (or possibly even in addition to) nanoscale $SiO_2$ particles consists in the creation of an improved permeation barrier effect of the coating particularly in the temperature range below 350° C. This improvement in turn brings about an improved anti-tarnishing protection by keeping oxygen away from the (high-grade) steel. According to a preferred variant of the present invention, the coating solution contains an aluminum compound, in particular an aluminum alkoxide, in order to selectively generate close orders with alkali aluminum silicate structure (i.e. in the case of Na as the alkali metal component, an albite=$Na[AlSi_3O_8]$ structure, in the case of K as the alkali metal component, an orthoclase or potassium feldspar=$K[AlSi_3O_8]$ structure). If the coating has such albite and/or orthoclase structures, it is characterized by excellent chemical stability. This variant is a possible candidate particularly if the substrate to be coated contains no aluminum. If the substrate to be coated contains aluminum, this aluminum in the substrate can be used to create an alkali aluminum silicate structure and does not need to be optionally added to the coating system.

In addition, the visual appearance of the coatings can be changed by incorporating colorants (e.g. pigments such as pearl luster pigments). For the coloration, normal temperature-resistant inorganic, preferably non-poisonous pigments or rather pigments producing no poisonous emissions are used, as are also employed in enamel colors. Particularly preferred pigments for the purpose of the invention are graphite, $TiO_2$ or a mixture of the two. Accordingly, the coating solution according to the invention preferably contains a temperature-resistant inorganic mica-based pigment, said pigment ensuring a metallic visual appearance.

Particularly preferred are embodiments in which the coating according to the invention has nanoscale $SiO_2$ particles and an aluminum compound, in particular an aluminum alkoxide, the $SiO_2$ particles and aluminum compound being of the type already described in detail above.

Also particularly preferred are embodiments in which the coating according to the invention has nanoscale $SiO_2$ particles and one of the abovementioned colorants (e.g. a pigment), the $SiO_2$ particles and colorant being of the type already described in detail above.

Also particularly preferred are embodiments in which the coating according to the invention has an aluminum compound, in particular an aluminum alkoxide, and one of the abovementioned colorants (e.g. a pigment), the aluminum compound and colorant being of the type already described in detail above.

Finally, embodiments are also preferred in which the coating according to the invention contains nanoscale $SiO_2$ particles, an aluminum compound (an aluminum alkoxide) and colorants (e.g. pigments, in particular pearl luster pigments), the $SiO_2$ particles, aluminum compound and colorants being of the type already described in detail above.

The method for producing the coating solution according to the invention in the sol state will now be described. This method comprises the following steps:

(a) prepare at least one silane of the general formula $R_xSi(OR')_{4-x}$ alone or with at least one polysiloxane of the general formula $[R_2SiO]y$ or $R_3Si-(O-SiR_2)_y-O-SiR_3$, where R, R', x and y are defined as above or more specifically in claim 1, and mix if necessary (i.e. hydrolysis and condensation of the silicatic components can proceed completely in the presence of the polysiloxane(s), the polysiloxane(s) can, however, only be added after formation/production of the coating solution in the sol state);

(b) add an alkali/alkaline-earth oxide/hydroxide to the silane or mixture in/from (a) (i.e. hydrolysis and condensation of the silicatic components takes place wholly in the presence of the alkali/alkaline-earth oxide/hydroxide);

(c) if required, add a colorant to the mixture in/from step (b) (i.e. hydrolysis and condensation of the silicatic components can proceed completely in the presence of the colorant, the colorant can, however, only be added after formation/production of the coating solution in the sol state, if at all); and (d) if required, add an aluminum compound, in particular an aluminum alkoxide, to the mixture in/from step (b) or (c) (i.e. hydrolysis and condensation of the silicatic components takes place wholly in the presence of the aluminum compound, the aluminum compound can, however, only be added after formation/production of the coating solution in the sol state).

The sequence of the steps (a), (b) and, if performed, steps (c) and (d) is arbitrary, so that e.g. the at least one silane can be added to the alkali/alkaline-earth oxide/hydroxide before the at least one polysiloxane is then added to this mixture, possibly also when hydrolysis and condensation are complete and the sol has been formed. Equally, however, it is also conceivable to add the alkali/alkaline-earth oxide/hydroxide to the at least one silane, allow hydrolysis and condensation to proceed and only then add the at least one polysiloxane to the mixture when hydrolysis and condensation are complete.

According to another preferred embodiment, the at least one silane is a mixture of methyltriethoxysilane and tetraethoxysilane, in particular in the ratio 3-4:1, specifically 3.4:1 (referred to mass).

According to the present invention, the coating solution has small quantities (up to 3%, referred to mass) of at least one alkali/alkaline-earth oxide or hydroxide. Accordingly, hydrolysis and condensation (after addition of water) take place in step (a) in the alkaline phase, the OH ions (possibly formed from the oxides) on the one hand assuming the role of a catalyst which in particular a basic component, in particular an alkali hydroxide, specifically potassium hydroxide (KOH). The coating solution therefore preferably contains small quantities (up to 3 wt. %) of said catalyst which for its part not only has a catalytic function, but is, moreover, also incorporated in the matrix of the finished coating.

According to a further preferred embodiment, the individual components, in terms of the silane mixture, are present in the following quantities in the coating finish or rather coating solution: polysiloxane 15 to 25 wt. %, preferably 20 wt. %, alkali/alkaline-earth oxide/hydroxide (simultaneously catalyst for hydrolysis and condensation of the silanes) 1 to 5 wt. %, in particular 2.8 wt. %, aluminum compound 0 to 35 wt. %, preferably 15 wt. %, colorant 0 to 20 wt. %, preferably 10 wt. %.

The above figures relating to the method for producing the coating solution consistently yield preferred embodiments also of the coating solution itself.

Another aspect of the present invention consists in consecutively applying a plurality of identical or preferably different coating solutions to a substrate, thereby enabling so-called primer and top coats to be produced. For example, adhesion to the base material can be improved by a primer coat produced according to the invention which is applied prior to a pigmented coating solution. It is likewise possible to protect pigmented coats produced according to the invention from chemical attack by means of a top coat. The coats can be fired on with or without intermediate drying either together of consecutively. On the other hand, the lower coat, if it is applied to Al-containing surfaces, can also be free from Al compounds, whereas the upper coat contains an Al compound in order to achieve the abovementioned effect resulting from the addition of Al compounds.

Accordingly, another aspect of the present invention is a bi- or multilayer coating which can be obtained by applying at least two different coating solutions as described above and characterized in claims 1 to 14.

Another aspect of the present invention is a component of a cooking appliance wherein the component has the coating as claimed in claim 16 or the bi-/multilayer coating as claimed in claim 17.

Properties/Processing of the Coating Solution

Surprisingly, it has been found that the matrix (based on the Si polymer) of the finished coating according to the present invention is established ("burnt off") even at/after firing-on temperatures of less than 300° C. to the extent that no more decomposition products are produced during operation by the user at temperatures of up to at least 420° C.

According to a preferred embodiment of the coating solution according to the invention, after being applied to the substrate the coating solution undergoes a drying step at 100 to 180° C., preferably at approximately 120° C. This drying causes the solvent to be removed from the coating, thereby allowing steep heating ramps to be used for densification and therefore fast process control with corresponding cycle times, as is essential in a production facility.

EXAMPLES

Example 1

Producing an $SiO_2$ coating Sol According to the Invention 2.8 wt. % potassium hydroxide is stirred into methyltriethoxysilane and tetraethoxysilane in the ratio (referred to mass) von 3.4:1 (together 88 wt. %) and dissolved at ambient temperature over a period of 13 h. A clear brownish liquid is produced. For hydrolysis and condensation, 9.2 wt. % water is then added dropwise with stirring, the solution becoming heated. When all the water has been added, the solution is cooled to room temperature. 19.7 wt. % diethoxy-polydimethylsiloxane referred to this mixture (consisting of the silanes, potassium hydroxide and water) is added as a polysiloxane.

Example 2

Producing an SiO$_2$ Coating Sol (Pigmented) According to the Invention 2.8 wt. % potassium hydroxide is stirred into methyltriethoxysilane and tetraethoxysilane in the ratio (referred to mass) von 3.4:1 (together 88 wt. %) and dissolved at ambient temperature over a period of 13 h. A clear brownish liquid is produced. For hydrolysis and condensation, 9.2 wt. % water is then added dropwise with stirring, the solution becoming heated. When all the water has been added, the solution is cooled to room temperature. 19.7 wt. % diethoxy-polydimethylsiloxane referred to this mixture (consisting of the silanes, potassium hydroxide and water) is added as a polysiloxane. Pigmentation is performed by adding mica pigments (10.6 wt. %, referred to the total finish)

Example 3

Producing an SiO$_2$ coating Sol (aluminum-doped) According to the Invention)

10 wt. % aluminum sec-butylate and 2.8 wt. % potassium hydroxide is stirred into methyltriethoxysilane and tetraethoxysilane in the ratio (referred to mass) von 3.4:1 (together 78 wt. %) and dissolved at ambient temperature over a period of 13 h. A clear brownish liquid is produced. For hydrolysis and condensation, 9.2 wt. % water is then added dropwise with stirring, the solution becoming heated. When all the water has been added, the solution is cooled to room temperature. 19.7 wt. % diethoxy-polydimethylsiloxane referred to this mixture (consisting of the silanes, potassium hydroxide, aluminum sec-butylate and water) is added as a polysiloxane.

Example 4

Using the SiO$_2$ Coating Sols Produced in Examples 1-3

The coating sols described in example 1 to 3 were diluted with 50 wt. % 2-butanol and sprayed onto cleaned steel substrates using a conventional spray gun. After a brief drying period (10 minutes) at 120° C. the coatings were then densified for 15 minutes at 500° C.

The invention claimed is:

1. A coating solution for forming a hardened pyrolysis resistant coating finish based on a mixture of at least one silane and at least one polysiloxane curable by hydrolysis and condensation on a substrate to thereby produce a coating on the substrate, the least one silane having the general formula $R_xSi(OR')_{4-x}$ and the at least one polysiloxane having the general formula $[R_2SiO]_y$ or $R_3Si$—(O—$SiR_2$)$_y$—O—$SiR_3$ wherein
the residues R are independently alkyl, aryl, arylalkyl, alkylaryl or H;
the residues R' are independently H, methyl, ethyl, n- or i-propyl, n-, iso-, sec- or tert-butyl;
x=0 or 1 (for the first silane);
x=0, 1, 2, 3 or 4 (for each additional silane); and
y is an integer which is at least 2;
the coating solution comprising at least one alkali or alkaline-earth metal containing reagent selected from the group consisting of alkali oxide, alkali hydroxide, alkaline earth oxide, and alkaline earth hydroxide;
wherein the ratio of the silane and polysiloxane mixture to the alkali or alkaline-earth metal containing reagent, referred to the atomic ratio Si:alkali/alkaline-earth metal, is 20:1 to 5:1.

2. The coating solution according to claim 1 wherein x is 1 for the first silane.

3. The coating solution according to claim 1 wherein the coating solution further comprises colorants.

4. The coating solution according to claim 3 wherein the temperature-resistant inorganic pigments are mica-based and provide a metallic visual appearance.

5. The coating solution according to claim 1 wherein the coating solution further comprises solvents wherein the boiling temperature of the solvent is greater than that of ethanol.

6. The coating solution according to claim 1 wherein R' is at least one of methyl or ethyl.

7. The coating solution according to claim 1 wherein the at least one silane is at least one of methyltriethoxysilane or tetraethoxysilane.

8. The coating solution according claim 1 wherein the alkali or alkaline-earth metal containing reagent is NaOH or KOH.

9. The coating solution according to claim 1 wherein R and R' are independently at least one of methyl or ethyl and x=1.

10. The coating solution according to claim 9 wherein R=methyl, R'=ethyl, the alkali or alkaline-earth metal containing reagent is KOH and x=1.

11. The coating solution according to claim 9 wherein R=methyl, R'=ethyl, the alkali or alkaline-earth metal containing reagent is NaOH and x=1.

12. The coating solution according to claim 1 wherein the coating solution contains an aluminum compound.

13. The coating solution according to claim 1 wherein the coating solution contains nanoscale SiO$_2$ particles.

14. A method for producing a coating solution for forming a hardened pyrolysis resistant coating finish, the method comprising:
(a) prepare at least one silane of the general formula $R_xSi(OR')_{4-x}$ alone or with at least one polysiloxane of the general formula $[R_2SiO]_y$ or $R_3Si$—(O—$SiR_2$)$_y$—O—$SiR_3$, wherein
the residues R are independently alkyl, aryl, arylalkyl, alkylaryl or H;
the residues R' are independently H, methyl, ethyl, n- or i-propyl, n-, iso-, sec- or tert-butyl;
x=0 or 1 (for the first silane);
x=0, 1, 2, 3 or 4 (for each further silane); and
y is an integer which is at least 2;
and mix if necessary;
(b) add an alkali/alkaline-earth oxide/hydroxide to the silane or mixture set forth in step (a);
(c) if required, add a colorant to the mixture in/from step (b); and
(d) if required, add an aluminum compound to the mixture set forth in at least one of step (b) and (c);
wherein the ratio of the silane and polysiloxane mixture to the alkali or alkaline-earth metal containing reagent, referred to the atomic ratio Si:alkali/alkaline-earth metal, is 20:1 to 5:1.

15. A coating which is a hardened pyrolysis resistant coating finish on a metal substrate, the coating being obtained by application, drying, densification and firing-on of the coating solution, the coating comprising a coating solution based on a mixture of at least one silane and at least one polysiloxane curable by hydrolysis and condensation on a substrate to thereby produce a coating on the substrate, the least one silane having the general formula $R_XSi(OR')_{4-X}$ and the at least one polysiloxane having the general formula $[R_2SiO]_y$ or $R_3Si—(O—SiR_2)_y—O—SiR_3$ wherein the residues R are independently alkyl, aryl, arylalkyl, alkylaryl or H;

the residues R' are independently H, methyl, ethyl, n- or i-propyl, n-, iso-, sec- or tert-butyl;

x=0 or 1 (for the first silane);

x=0, 1, 2, 3 or 4 (for each additional silane); and y is an integer which is at least 2; and at least one alkali or alkaline-earth metal containing reagent is selected from the group consisting of alkali oxide, alkali hydroxide, alkaline earth oxide, and alkaline earth hydroxide;

wherein the ratio of the silane and polysiloxane mixture to the alkali or alkaline-earth metal containing reagent, referred to the atomic ratio Si:alkali/alkaline-earth metal, is 20:1 to 5:1.

16. A bi- or multilayer coating, obtained by applying at least two different coating solutions, the coating comprising at least two layers wherein each layer includes a coating solution based on a mixture of at least one silane and at least one polysiloxane curable by hydrolysis and condensation on a substrate to thereby produce a coating on the substrate, the least one silane having the general formula $R_XSi(OR')_{4-X}$ and the at least one polysiloxane having the general formula $[R_2SiO]_y$ or $R_3Si—(O—SiR_2)_y—O—SiR_3$ wherein the residues R are independently alkyl, aryl, arylalkyl, alkylaryl or H;

the residues R' are independently H, methyl, ethyl, n- or i-propyl, n-, iso-, sec- or tert-butyl;

x=0 or 1 (for the first silane);

x=0, 1, 2, 3 or 4 (for each additional silane); and y is an integer which is at least 2; and at least one alkali or alkaline-earth metal containing reagent is selected from the group consisting of alkali oxide, alkali hydroxide, alkaline earth oxide, and alkaline earth hydroxide.

17. A component of a cooking appliance comprising a component body and a coating disposed on the component body wherein the coating includes a coating solution based on a mixture of at least one silane and at least one polysiloxane curable by hydrolysis and condensation on a substrate to thereby produce a coating on the substrate, the least one silane having the general formula $R_XSi(OR')_{4-X}$ and the at least one polysiloxane having the general formula $[R_2SiO]_y$ or $R_3Si—(O—SiR_2)_y—O—SiR_3$ wherein the residues R are independently alkyl, aryl, arylalkyl, alkylaryl or H;

the residues R' are independently H, methyl, ethyl, n- or i-propyl, n-, iso-, sec- or tert-butyl;

x=0 or 1 (for the first silane);

x=0, 1, 2, 3 or 4 (for each additional silane); and y is an integer which is at least 2; and at least one alkali or alkaline-earth metal containing reagent is selected from the group consisting of alkali oxide, alkali hydroxide, alkaline earth oxide, and alkaline earth hydroxide.

18. The coating solution according to claim 3 wherein the colorants comprises temperature-resistant inorganic pigments.

19. The coating solution according claim 1 wherein the atomic ratio Si:alkali/alkaline-earth metal, is 15:1 to 10:1.

20. The coating solution according claim 1 wherein the atomic ratio Si:alkali/alkaline-earth metal, is 12:1 to 11:1.

21. A coating solution based on a mixture of at least one silane and at least one polysiloxane curable by hydrolysis and condensation on a substrate to thereby produce a coating on the substrate, the least one silane having the general formula $R_XSi(OR')_{4-X}$ and the at least one polysiloxane having the general formula $[R_2SiO]_y$ or $R_3Si—(O—SiR_2)_y—O—SiR_3$ wherein the residues R are independently alkyl, aryl, arylalkyl, alkylaryl or H;

the residues R' are independently H, methyl, ethyl, n- or i-propyl, n-, iso-, sec- or tert-butyl;

x=0 or 1 (for the first silane);

x=0, 1, 2, 3 or 4 (for each additional silane); and y is an integer which is at least 2;

the coating solution comprising at least one alkali or alkaline-earth metal containing reagent selected from the group consisting of alkali oxide, alkali hydroxide, alkaline earth oxide, and alkaline earth hydroxide;

wherein the coating solution contains an aluminum compound; and wherein the aluminum compound comprises an aluminum alkoxide.

22. A method for producing a coating solution for forming a hardened pyrolysis resistant coating finish, the method comprising:

(a) prepare at least one silane of the general formula $R_XSi(OR')_{4-X}$ alone or with at least one polysiloxane of the general formula $[R_2SiO]_y$ or $R_3Si—(O—SiR_2)_y—O—SiR_3$, wherein the residues R are independently alkyl, aryl, arylalkyl, alkylaryl or H;

the residues R' are independently H, methyl, ethyl, n- or i-propyl, n-, iso-, sec- or tert-butyl;

x=0 or 1 (for the first silane);

x=0, 1, 2, 3 or 4 (for each further silane); and y is an integer which is at least 2;

and mix if necessary;

(b) add an alkali/alkaline-earth oxide/hydroxide to the silane or mixture set forth in step (a);

(c) if required, add a colorant to the mixture in/from step (b); and (d) add an aluminum compound to the mixture set forth in at least one of step (b) and (c).

23. A coating solution based on a mixture of at least one silane and at least one polysiloxane curable by hydrolysis and condensation on a substrate to thereby produce a coating on the substrate, the least one silane having the general formula $R_XSi(OR')_{4-X}$ and the at least one polysiloxane having the general formula $R_3Si—(O—SiR_2)_y—O—SiR_3$ wherein the residues R are independently alkyl, aryl, arylalkyl, alkylaryl or H;

the residues R' are independently H, methyl, ethyl, n- or i-propyl, n-, iso-, sec- or tert-butyl;

x=0 or 1 (for the first silane);

x=0, 1, 2, 3 or 4 (for each additional silane); and y is an integer which is at least 2;

the coating solution comprising at least one alkali or alkaline-earth metal containing reagent selected from the group consisting of alkali oxide, alkali hydroxide, alkaline earth oxide, and alkaline earth hydroxide.

* * * * *